Jan. 30, 1951     J. B. GEHMAN     2,539,616
STRAIGHT-LINE COURSE COMPUTER
Filed March 31, 1950     2 Sheets-Sheet 1

INVENTOR
John B. Gehman
BY
ATTORNEY

Jan. 30, 1951    J. B. GEHMAN    2,539,616
STRAIGHT-LINE COURSE COMPUTER
Filed March 31, 1950    2 Sheets-Sheet 2
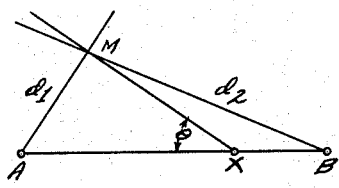
Fig. 5.
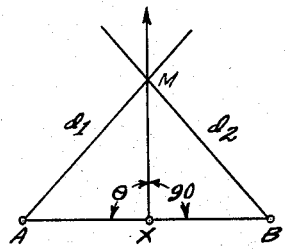
Fig. 6.
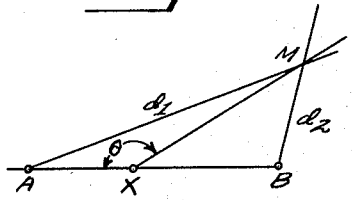
Fig. 7.
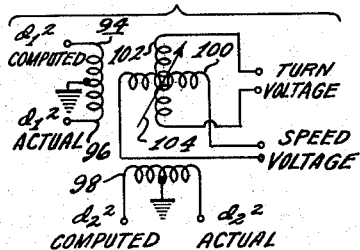
Fig. 8.
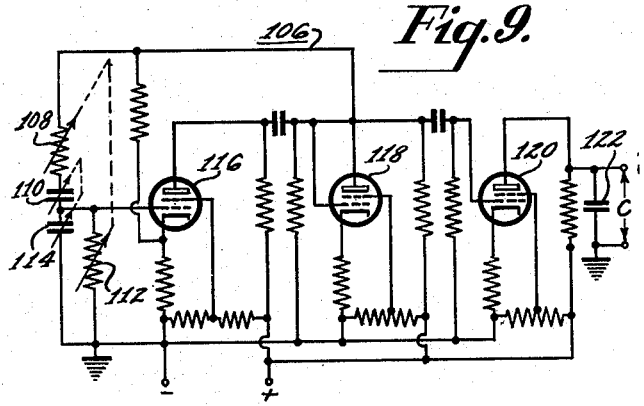
Fig. 9.
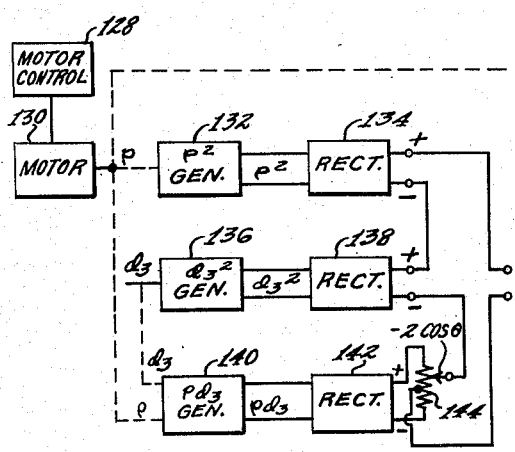
Fig. 10.
Fig. 11.
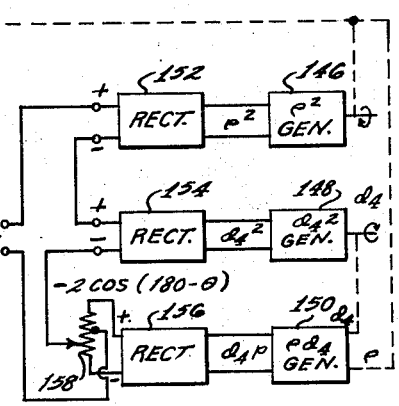
INVENTOR
John B. Gehman
BY
ATTORNEY

Patented Jan. 30, 1951

2,539,616

UNITED STATES PATENT OFFICE 2,539,616

STRAIGHT-LINE COURSE COMPUTER

John B. Gehman, Haddonfield, N. J., assignor to Radio Corporation of America, a corporation of Delaware Application March 31, 1950, Serial No. 153,150

8 Claims. (Cl. 235—61)

This invention relates generally to navigation systems and more specifically to a system for guiding a vehicle along a straight line path as referred to two fixed positions.

Occasions arise wherein a vehicle such as an airplane is required to travel in a straightline path with a predetermined heading angle and at a predetermined ground speed repetitively. In aerial photography, or patrol or search work, the paths traveled are parallel straight lines which resemble a grid.

It is an object of the present invention to provide a computer which supplies data for guiding a vehicle along a straight line ground path, with a predetermined direction of ground motion and at a predetermined ground speed.

It is another object of the present invention to provide a computer which automatically solves for the length of one side in each of two adjacent triangles when provided with data as to the lengths of the other two sides in each triangle and the included angles.

These and other objects are achieved in the present invention by a computer which automatically determines the distances a vehicle should be from two fixed points in accordance with its predetermined speed and heading angle. These distances are expressed as potentials. These distances are compared with the actual distance from these two points which are also expressed as potentials. Any error voltages which occur as a result of these comparisons may be used to actuate an indicator or to automatically correct the course and speed of the vehicle to compensate for any deviations thereof.

The two fixed positions referred to herein are two stations which are at a known distance apart and have radio transmitting apparatus of the type which responds to signals transmitted from the airplane to supply information as to the airplane's actual distance from these two points. Apparatus for this type of navigation system is described and claimed in an application by S. W. Seeley, Serial No. 638,387, now Patent No. 2,526,-287, filed December 29, 1945, and assigned to a common assignee. The distance between the two points is known. The direction of ground motion or heading of the vehicle or angle it makes with the base line formed by the line joining the two fixed points is predetermined. The speed at which the vehicle is to travel is also predetermined. The distance of the point of intersection of the vehicle with the base line from each of the two fixed points is also known. This information corresponds to data as to the two sides and includes angles of two adjacent triangles formed by (1) the two fixed points, (2) the point of intersection of the base line with the vehicle heading and (3) the vehicle position. This information is then supplied to the computer which solves for the lengths of the third sides of the triangles.

These two computed distances fix the position of the vehicle in accordance with the predetermined heading and speed and they are compared with the actual distances from the fixed points to determine if any differences exist.

The novel features of the invention as well as the invention itself, both as to its organization and method of operation, will best be understood from the following description, when read in connection with the accompanying drawings, in which.

Figure 4:
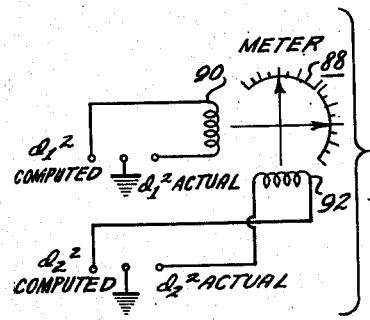

Figure 4 is a circuit diagram illustrating one type of meter for displaying the information provided by the embodiment of the invention, Figures 5, 6 and 7 are graphs illustrating the effects on the error voltages of a number of possible deviations from the predetermined heading and speed, Figure 8 is a circuit diagram of apparatus for deriving speed and turn error voltages from comparison of the computed distance voltages with the actual distance voltages, Figure 9 is a circuit diagram of another basic system which finds application in another embodiment of the present invention, Figure 10 is a circuit diagram of a low pass filter, and Figure 11 is a schematic diagram of another embodiment of the invention.

Figure 1:
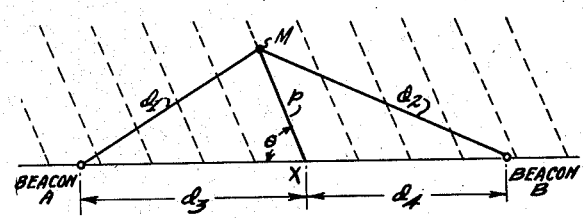
Figure 1 is a graph illustrating the problem to be solved.

Referring to Figure 1, points A and B are radio beacon stations of the type described in the above identified application by Seeley and are known as "Shoran" stations. The distance between A and B is accurately known. Point M represents the airplane or vehicle position. The airplane must travel along a straight line course at a heading angle $\theta$. This heading angle $\theta$ is the angle made by the airplane course with the base line extending through points A and B. The distances $d_3$ and $d_4$ are the respective distances between the point X, which is the intersection of the course with the base line, and points A and B. These distances $d_3$ and $d_4$ are known. The distance between M and X represents the product of the desired speed of travel and the time elapsed since leaving the base line and is indicated as $\rho$. If a plane is to fly at a given heading angle in a straight line at a predetermined speed, the problem is to continuously solve for the distances the plane should be from both fixed points in accordance with those predetermined factors. Comparison can be continuously made between the computed distances and the actual distance information supplied by beacon points A and B for the purpose of compensating for any differences.

It will be readily recognized, that two adjacent triangles are shown in Figure 1 and in each triangle two of the sides and the included angle are known. The third sides, representing the distances from the plane to the fixed points A and B may be readily found from the equations:

$$d_1^2 = d_3^2 + \rho^2 - 2d_3\rho \cos \theta$$
$$d_2^2 = d_4^2 + \rho^2 - 2d_4\rho \cos (180° - \theta)$$

Figure 2:
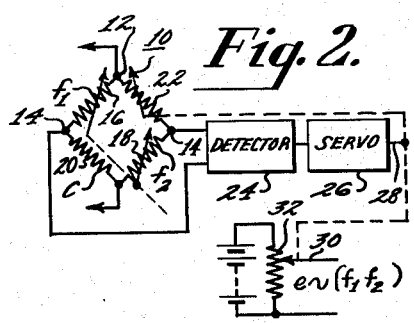
Figure 2 is a schematic diagram of a basic system finding application in an embodiment of the present invention for obtaining a potential proportional to the product of two functions expressed as shaft positions.

Referring to Figure 2, there may be seen a schematic representation of an impedance bridge 10 having a pair of input terminals 12 to which a potential is applied and a pair of null detecting terminals 14 for detecting a balance. The bridge has four impedance arms 16, 18, 20, 22 or two pairs of opposed impedance arms. Two functions $f_1$ and $f_2$ are expressed as the positions of two shafts. The impedances in one of the pairs of opposed arms 16, 18 (1) are variable, (2) are respectively calibrated in terms of $f_1$ and $f_2$ and (3) are respectively coupled to be varied by the two shafts. The impedance of one of the other of the pairs of opposed arms 20 is a constant C. The impedance in the remaining arm 22 is variable H and has a value selected to permit the balancing of the bridge for all impedance variations caused in the variable arms. A detector 24 is coupled to the null detecting terminals 14 and its output is coupled to a servomotor 26. The servomotor shaft 28 is mechanically coupled to the variable impedance arm 22. The mechanical coupling is represented by a dotted line. The servomotor shaft 28 is also coupled to the movable arm 30 of a potentiometer 32.

It will be readily apparent that the bridge 10, detector 24, and servomotor 26 form a servo loop wherein the servomotor always turns in a direction to reduce the voltage applied to its terminals by the detector to a minimum. In view of the mechanical coupling to the H impedance arm of the bridge, for any setting of the arms $f_1$ and $f_2$, the servomotor will adjust arm H until the bridge is balanced.

For bridge balance, $$\frac{f_1}{C} = \frac{H}{f_2}, \frac{f_1 f_2}{C} = H, H \sim f_1 f_2$$

Therefore, for any shaft settings of the arms $f_1$ and $f_2$, the servomotor shaft turns an amount proportional to the product of the shaft settings. Accordingly, the potentiometer movable arm 32 which is coupled to the servo shaft is moved an amount proportional to the product of the two functions. The output voltage from the potentiometer is also proportional to the product of the two functions. If $f_1$ and $f_2$ are always equal, these two arms may have their variable impedances ganged to be movable simultaneously. The voltage output of the potentiometer, accordingly, is proportional to the square of the function which is applied to the bridge as a shaft position.

Figure 3:
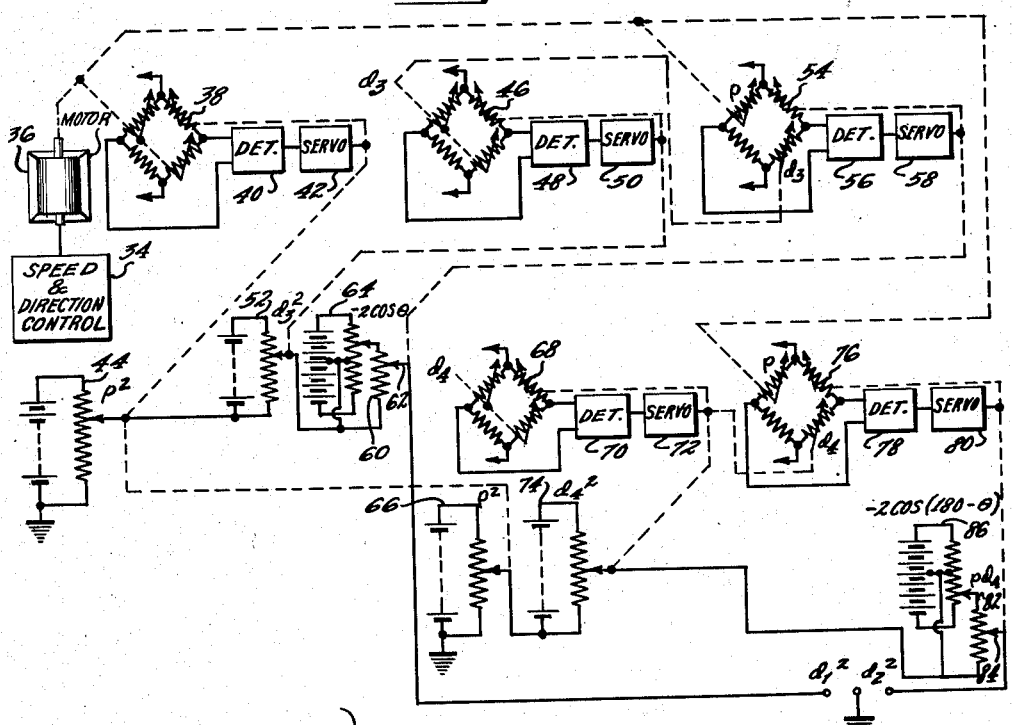
Figure 3 is a schematic diagram of one embodiment of the invention.

Referring now to Figure 3, there is shown a schematic diagram of an embodiment of the invention for computing $d_1^2$ and $d_2^2$ in accordance with the computed course for the plane. A motor 36 is controlled in speed and direction of shaft rotation by any well known motor speed and direction control apparatus 34. The motor shaft is coupled to drive two ganged, opposed, variable impedance arms of a first bridge 38 which are calibrated in terms of $\rho$. The motor speed is controlled so that its shaft changes the impedance $\rho$ at a rate in proportion to the predetermined speed of the plane for the course chosen. The first bridge, detector 40, servomotor 42 and potentiometer 44 are similar to those shown and explained in Figure 2. The motor is started as soon as the plane crosses the base line between points A and B. Accordingly, the value of "$\rho$" applied to the bridge 38 is a product of the predetermined speed and the time elapsed since the plane intersected the base line. The shaft of the servomotor, accordingly, is turned an amount proportional to $\rho^2$ and the output potential of the potentiometer 44 is proportional to $\rho^2$.

A second bridge 46 is provided having a pair of ganged, movable arms calibrated in terms of the distance $d_3$. The distance $d_3$ is known for the course chosen and is set into the bridge. The second bridge 46, detector 48, servomotor 50, and potentiometer 52 function to provide a potential proportional to $d_3^2$ or to the square of the distance between point A and the point of intersection of the vehicle with the base line function in the manner as described for the system shown in Figure 2.

A third bridge 54 is provided in which one variable impedance arm is calibrated in terms of the distance $\rho$ and is coupled to be driven by the motor shaft. An opposed variable impedance arm is calibrated in terms of the distance $d_3$ and is mechanically coupled to be driven by the shaft that is used to set in the known value $d_3$. Accordingly, the potentiometer movable arm 62 which is driven by the servomotor 58 of this bridge 54 is positioned proportionally to the product of $\rho$ and $d_3$.

A center-tapped potentiometer 64 is connected across a source of potential and is calibrated so that its movable arm may be adjusted to provide an output potential proportional to $-2 \cos \theta$. Since $\theta$, the heading angle, varies in value between zero and 180 degrees ($\cos \theta$ varies between zero and plus or minus one), a potentiometer such as the one shown herein 64, which has its resistance winding tapped at the center and connected to the midpoint of a potential source to which the outer ends of the winding are connected, may readily be calibrated to provide an output proportional to $-2 \cos \theta$.

The $\rho^2$ potentiometer 44 movable arm is connected to one side of the $d_3^2$ potentiometer 52. The potential at the $d_3^2$ potentiometer arm is then representative of $\rho^2 + d_3^2$. The movable arm of the $d_3^2$ potentiometer 52 is then connected to one side of the $\rho d_3$ potentiometer 60. The output of the $-2 \cos \theta$ potentiometer 64 is applied to the input of the $\rho d_3$ potentiometer 60. Therefore, the potential between the $\rho d_3$ potentiometer movable arm 62 and ground is representative of $\rho^2 + d_3^2 - 2\rho d_3 \cos \theta$ which is equal to $d_1^2$ computed. A solution for $d_2^2$ in the adjacent triangle (see Fig. 1) is similarly found. Another potentiometer 66 is ganged to the shaft of the servomotor 42 to provide an output potential proportional to $\rho^2$. A fourth bridge, 68, detector 70, servomotor 72 and potentiometer 74 are provided for obtaining a potential proportional to $d_4^2$. The distance $d_4$ is a known value, being the distance from the point of intersection of the plane with the base line to the point B.

The shafts which represent $\rho$ and $d_4$ are also coupled to two opposed variable impedance arms of a fifth impedance bridge 76 which is also connected in a servo loop. A potentiometer 82, whose movable arm 84 is mechanically coupled to the servo shaft output, is accordingly positioned proportionally to the product $\rho d_4$. The latter potentiometer 82 has applied to it the output of a center-tapped potentiometer 86 whose movable arm is positioned in accordance with $-2 \cos(180°-\theta)$. The potentiometers 66, 74, 82, 86 are connected to each other, as explained above for obtaining $d_1^2$, in a fashion to add their outputs. The potential between the $\rho d_4$ potentiometer movable arm 84 and ground then represents $\rho^2 + d_4^2 - 2\rho d_4 \cos(180°-\theta)$ which equals $d_2^2$ computed. All the bridges shown in Figure 3 have the terminals, to which potential is applied, brought out and shown as arrows. A source of potential and connections from the bridges to this source are not shown, since they would only serve to complicate the drawing.

Figure 4 is a schematic diagram of a meter which is used to show a deviation between the actual and the computed position of the plane. The radio navigation apparatus described in the above noted Seeley application provides the actual distances between the plane and the two fixed points in the form of shaft positions. These shafts may be coupled to two bridge type servo loops as described and shown in Figure 2 and voltages proportional to $d_1^2$ actual and $d_2^2$ actual may be obtained from potentiometers ganged to the respective servomotor shafts. The actual and computed $d_1^2$ are opposingly applied to one winding 90 of the crossed pointer meter 88 shown in Figure 4. The actual and computed $d_2^2$ are opposingly applied to the other winding 92 of the crossed pointer meter 88. When the crossed pointers read zero, the plane is following its predetermined course.

Figures 5, 6 and 7 respectively represent the conditions when the heading angle is approaching zero degrees, 90 degrees and 180 degrees. Referring to Figure 5, if the plane travels faster than its predetermined speed, the distance $d_2$ actual is greater than the distance $d_2$ computed. If the plane travels slower than its computed speed, $d_2$ actual is less than $d_2$ computed. For either the slow or the fast speed condition of the plane, the difference between $d_1$ actual and $d_1$ computed is negligible and does not appear. If the plane is to the right of its computed course, $d_1$ actual is greater than $d_1$ computed. If the plane is to the left of its computed course $d_1$ actual is less than $d_1$ computed. For either the right or left condition, the difference between $d_2$ actual and $d_2$ computed is negligible and does not appear. The above indicated conditions are set forth in the form of a table with a "+" sign indicating that the actual distance is greater than the computed distance and a "−" sign indicating that the actual distance is less than the computed distance:

| Plane | $d_1$act. | $d_2$act. |
|---|---|---|
| Too Fast | 0 | + |
| Too Slow | 0 | − |
| To Right | + | 0 |
| To Left | − | 0 |

For the 90 degree heading angle condition, as shown in Figure 6, the table appears as follows:

| Plane | $d_1$act. | $d_2$act. |
|---|---|---|
| Too Fast | + | + |
| Too Slow | − | − |
| To Right | + | − |
| To Left | − | + |

For the situation shown in Figure 7 where the heading angle approaches 180 degrees, the table appears as follows:

| Plane | $d_1$act. | $d_2$act. |
|---|---|---|
| Too Fast | + | 0 |
| Too Slow | − | 0 |
| To Right | 0 | − |
| To Left | 0 | + |

For manual operation of the plane, the meter shown in Figure 4 may be observed and correction in the plane's speed and direction may be made until the crossed pointers are both brought back to a zero reading. By substituting A.-C. generators which are synchronized, or a single A.-C. source for all the potentiometers, A.-C. voltages proportional to $d_1^2$ computed and $d_2^2$ computed are obtained. These may be compared with A.-C. voltages proportional to $d_1^2$ actual and $d_2^2$ actual and the resultant error voltages used for automatic control of the plane.

In Figure 8 a differential resolver 94 is shown schematically. This resolver 94 has a stator with two stator windings 96, 98. Each of these windings is center tapped and the windings are oriented at right angles with respect to one another. The field which they set up, when excited, is the vector addition of the field from each winding. The rotor of the angle resolver also has two separate windings 100, 102 disposed to be rotated within the fields set up by the stator windings. The rotor windings 100, 102 are oriented at right angles with respect to each other. The field which they set up, if they were to be excited, would be the vector addition of the field from each winding.

The voltages $d_1^2$ actual and $d_1^2$ computed are opposingly connected to one stator winding 96 and the voltage $d_2^2$ actual and $d_2^2$ computed are opposingly connected to the other stator winding 98. The rotor shaft 104 is displaced from a reference position at an angle corresponding to the heading angle. The rotor shaft reference position ($\theta = 0°$) should be the one at which each of the rotor coils 100, 102 is parallel to each of the stator coils 96, 98 or is in a maximum inducing relationship with it. The rotor winding 102 parallel to the stator winding 96 to which $d_1^2$ voltages are applied is the winding which produces an error voltage output representative of an error in direction. The rotor winding 100, parallel to the stator winding 98 to which $d_2^2$ voltages are applied, is the winding which produces an error voltage output representative of an error in speed. The angle of rotor shaft rotation is such that it is equal to one-half the heading angle. Operation of the differential resolver thus occurs in 90 degrees of revolution. Any quadrant may be selected providing due care is taken in observing the proper polarity in connecting the rotor windings to operate automatic control equipment.

From the previously noted tables it can be seen that the appearance of an error signal as well as its relative value varies with the heading angle. The output of the angle resolver, when operated on by the angle $\theta$, shows consistent results for speed and turn indications and may be directly connected to the plane's automatic control equipment. When a combination of an error in speed and being either to the right or to the left of the course occurs, either both corrections are made simultaneously or, if, in view of the error in the plane's position one error voltage is cancelled, the remaining error voltage will operate to correct the plane's course until the error voltage which was cancelled begins to appear because of the correction which has occurred.

In Figure 1 a number of parallel paths for an assumed mapping operation are shown as dotted lines. The heading angle and speed may remain the same for all of them. Only the distances $d_3$ and $d_4$ change for each path. When the plane has flown to the end of its run, the shaft positions for $d_3$ and $d_4$ are set to their new values and the motor turning the shaft at the predetermined speed is stopped. The plane is then turned and brought to the next path. When the $d_1^2$ and $d_2^2$ voltages, which are computed with the new values of $d_3$ and $d_4$, equal the actual $d_1^2$ and $d_2^2$ values, the motor is started in a reverse direction and the plane may be automatically controlled again. This procedure may be followed at each end of the course. Upon reaching the base line the motor is again stopped and the new values of $d_3$ and $d_4$ are set into the computer. The plane is turned to the new position on the base line as located from the two beacon stations and the motor is started in a direction to increase $\rho$.

For the situation where the selected course for the plane is on both sides of the base line, the computer is also readily adaptable for use. All that is required is a reversing switch that automatically reverses the direction of rotation of the motor which produces the shaft position $\rho$ when the base line is crossed (when $\rho$ equals zero). There is also required a mechanism to switch the setting of the $-2 \cos \theta$ potentiometer to $-2 \cos (180°-\theta)$ and the setting of the $-2 \cos (180°-\theta)$ potentiometer to $-2 \cos \theta$. The potentiometers may be switched by providing auxiliary potentiometers for the $-2 \cos \theta$ and $-2 \cos (180°-\theta)$ potentiometers in the computer and switching the potentiometers in and out of the circuit by means of relays also actuated by the switch which reverses the motor. The differential resolver may be manually turned to the complement of the heading angle or an auxiliary motor operated by relays may be provided to perform this operation.

Referring now to Figure 9, there is shown a circuit diagram of another means for obtaining a potential proportional to the product of two functions expressed as positions of a shaft. The circuit shows a variable frequency oscillation generator 106 of the well-known type described in Patent No. 2,268,872 by William R. Hewlett. In this type of oscillator the frequency of oscillation is determined by the values of the variable, series-connected, resistor 108 and condenser 110 combination connected in series with a variable, parallel connected, resistor 112 and condenser 114. The first electron tube 116 in the oscillator is an oscillation stage, the second electron tube 118 is a phase shift stage. The third electron tube 120 is a stage of amplification with a condenser 122 across its output.

It can be shown that the frequency of the oscillation generator 106 is determined by $$f = 2\pi R_1 R_2 C_1 C_2$$

where $f$ is the frequency
$R_1$ and $R_2$ are resistors 108 and 112 respectively, and
$C_1$ and $C_2$ are condensers 110 and 114 respectively.

Ganging the variable resistors so that their values are always equal and ganging the variable condensers so that their values are always equal leads to $$f = \frac{1}{2\pi RC} \text{ or } f \sim \frac{1}{RC}$$

where

R is the value of either resistor 108 or 112 and
C is the value of either capacitor 110 or 114.

Figure 10 shows a series-connected high impedance represented by a resistor 124, to which an input voltage $e_i$ is applied, and a parallel connected condenser 126. For those frequencies above where the resistance of the resistor equals the reactance of the condenser, the voltage $e_0$ across the condenser is inversely proportional to the frequency applied to the circuit or $$\frac{1}{e_0} \sim f$$

Applying a series of high impedance and a shunt condenser to the output of the oscillation generator represented in Figure 9 provides $$\frac{1}{e_0} \sim \frac{1}{RC}$$

or the potential across the output condenser is proportional to the product of the value of either resistor 108 or 112 and either condenser 110 or 114. The pentode amplification stage 120 provides the required high series impedance and the condenser 122 across the output is the shunt condenser. Therefore, if the ganged variable resistors 108, 112 are moved to a position proportional to one function expressed as a shaft position and if the ganged variable capacitors 110, 114 are moved to a position proportional to a second function expressed as a shaft position, the potential existing across the output condenser 122 is proportional to the product of the two functions. If the two functions have the same values the output potential is proportional to the square of one of the functions.

Figure 11 represents another embodiment of this invention utilizing the circuit shown in Figure 9. A motor speed and direction control mechanism 128 and a motor 130 are used, in similar fashion as described for Figure 3, to generate a shaft position proportional to $\rho$. A rectangle identified as $\rho^2$ generator 132 is representative of the circuit shown in Figure 9. The motor shaft is coupled to the ganged variable resistors and ganged variable condensers of the $\rho^2$ generator 132 to vary them simultaneously. These condensers and resistors are calibrated in terms of $\rho$ instead of frequency. The output of the $\rho^2$ generator 132 is a voltage proportional to $\rho^2$ which is then rectified by a rectifier 134 to be a D. C. potential.

A $d_3^2$ generator 136 is provided which is also a circuit similar to the one shown in Figure 9. The variable condensers and resistors of the $d_3^2$ generator 136 are all ganged to be simultaneously variable and equal and are calibrated in terms of $d_3$. Therefore, when the value of $d_3$ is set into the generator an output potential is provided proportional to $d_3^2$. This is also rectified by the rectifier 138 represented schematically.

A third $\rho d_3$ generator 140 is provided having its ganged, variable resistors coupled to the motor shaft to be positioned thereby and calibrated in terms of $\rho$. Its ganged, variable condensers are coupled to the $d_3$ shaft to be positioned thereby and are also calibrated in terms of $d_3$. The $\rho d_3$ generator 140 output is then $\rho d_3$. This output is rectified by the rectifier 142 and applied across the winding of a center tapped potentiometer 144. Output from the potentiometer 144 is taken from its movable arm and the center tap. The potentiometer is calibrated in terms of $-2 \cos \theta$ as described for the potentiometer in Figure 3. The potentiometer movable arm is then positioned in accordance with the value of $-2 \cos \theta$ and the output is then $-2d_3\rho \cos \theta$. The potential outputs of the two rectifiers 134, 138 and the potentiometer 144 are then added in series and their sum is a potential proportional to the value of $d_1^2$.

In similar fashion, using three potential generators 146, 148, 150 as shown in Figure 9, potentials proportional to $\rho^2$, $d_4^2$, and $\rho d_4$ are generated from the respective shaft positions. These potentials are then rectified by the respective rectifiers 152, 154, 156. The rectified potential proportional to $\rho d_4$ is then applied to a center tapped potentiometer 158 calibrated in terms of $-2 \cos (180°-\theta)$. The potentiometer 158 output, and the rectified potentials representative of $\rho^2$ and $d_4^2$ are then added together to provide at the output terminals a potential proportional to $d_2^2$. The computed potentials $d_1^2$ and $d_2^2$ may then be utilized in the above described fashion for guiding the vehicle.

What has been herein described and shown is a novel computer system which provides information for guiding a plane along a predetermined straight line path at a predetermined ground speed by providing potentials which are proportional to the square of the distances between the plane and two fixed points. These potentials are representative of the distance the vehicle should be from the two fixed points in accordance with the predetermined speed and heading angle. These potentials are then compared with potentials which are proportional to the actual distances of the plane to the two fixed points. Any resulting error voltages are used to restore the plane to the course from which it has deviated.

What is claimed is:

1. In a computer for guiding a vehicle along a predetermined course at a predetermined speed in response to information based on the position of said vehicle with respect to a first and a second point, the combination of means for producing a first potential proportional to the square of the distance said vehicle should be from said first point according to said predetermined course and speed, means for producing a second potential proportional to the square of the distance said vehicle should be from said second point according to said predetermined course and speed, means for producing a third potential proportional to the square of the actual distance of said vehicle from said first point, means for producing a fourth potential proportional to the square of the actual distance of said vehicle from said second point, means for combining said first and third potentials and said second and fourth potentials to provide an indication of the deviation between the actual and predetermined speed and the deviation of said vehicle from its predetermined course.

2. In a computer for guiding a vehicle along a predetermined course at a predetermined speed in response to information based on the position of said vehicle with respect to a first and a second point, the angle made by said course with the base line joining said first and second point, the time elapsed since crossing said base line, and the distance between the point of intersection of said course with said base line and said two points, means for generating potentials proportional to the squares of each of two sides, the product of said two sides and twice the negative of the cosine of the angle included between said two sides, in each of the two triangles formed by the vehicle position according to said predetermined course and speed, said first and second points and said point of intersection of said vehicle course with said base line, one of said two sides in each triangle being the common side formed by the distance between said point of intersection and said vehicle position according to said predetermined course and speed, the other of said two sides in each triangle being the side formed by the portion of said base line included in the respective triangles, means to combine the potentials produced for each triangle to provide for each triangle a potential proportional to the square of the third side, means to produce for each triangle a potential proportional to the square of the actual length of said third side, and means to combine said third side potentials for each triangle to provide error potentials indicative of the deviation between the actual and predetermined speed and the deviation of said vehicle from said predetermined course.

3. In a computer for guiding a vehicle along a predetermined course at a predetermined speed in response to information based on the position of said vehicle with respect to a first and a second point, the angle made by said course with the base line joining said first and second points and the distance between the point of intersection of said course with said base line, the instant at which said vehicle crosses said base line, and said first and second points, the combination of means for producing nine potentials as follows: a first potential proportional in value to the square of the product of said predetermined speed and the time elapsed since the vehicle left said point of intersection, a second potential proportional in value to the square of the distance from said first point to said point of intersection, a third potential proportional in value to the product of the product of said predetermined speed and the time elapsed since the vehicle left said point of intersection and said distance from said first point to said point of intersection, a fourth potential proportional to the negative of twice the cosine of the angle made by said vehicle course with that part of the baseline between said point of intersection and said first point, a fifth potential proportional to the square of the distance between said point of intersection and said second point, a sixth potential proportional to the product of said distance between said point of intersection and said second point and said product of said predetermined speed and the time elapsed since said vehicle left said point of intersection, a seventh potential proportional to the negative of twice the cosine of the angle made by said vehicle course with that part of the baseline between said point of intersection and said second point, an eighth potential proportional to the square of the actual distance between said vehicle and said first point, a ninth potential proportional to the square of the actual distance between said vehicle and said second point, means to multiply said third and fourth potentials, means to add said third and fourth potential product, said first potential and said second potential to provide a tenth potential proportional to the square of the computed distance between said vehicle and said first point, means to multiply said sixth and seventh potentials, means to add the product of said sixth and seventh potential to said first potential and said fifth potential to provide an eleventh potential proportional to the square of the computed distance between said vehicle and said second point, and means to combine said eighth and tenth potentials and said ninth and eleventh potentials to provide error potentials proportional to the difference between the actual and predetermined speed along said course and proportional to the distance to the right or left of said course.

4. A computer as recited in claim 2 wherein each of said means to produce a potential proportional to the square of a distance comprises an impedance bridge having a first and a second pair of opposed arms, a pair of input terminals and a pair of null detecting terminals, the impedances in each of said first pair of arms being calibrated in accordance with said distance, the impedance in one of said second pair of arms being a constant and the impedance in the other of said second pair of arms being adjustable and having a value selected to permit balancing of said bridge for impedance variations of said first pair of arms, a detector coupled to said null detecting terminal, a servomotor electrically coupled to said detector, the shaft of said servomotor being coupled to the adjustable one of said second pair of arms, a potentiometer calibrated in terms of said distance to be squared, the movable arm of said potentiometer being coupled to be driven by said servo motor shaft, each of said first pair of arms being adjusted proportional to a distance whereby said servomotor adjusts said adjustable arm of said second pair of arms to balance said bridge and said potentiometer movable arm is positioned to provide an output potential proportional to the square of said distance.

5. A computer as recited in claim 3 wherein each of said means to produce a potential proportional to the square of a distance comprises a variable frequency oscillation generator of the variable resistance-capacity type wherein the frequency determining elements consist of a series connected variable resistor and variable condenser connected in series with a parallel connected variable resistor and variable condenser, said variable resistors being ganged to be simultaneously adjustable and to have equal values, said variable condensers being ganged to be simultaneously adjustable and to have equal values, said variable resistors and said variable condensers each being calibrated in terms of said distance, a high impedance connected in series with the output from said oscillator, and a condenser connected in parallel with said oscillation output through said high impedance, the potential output across said condenser being proportional to the product of the distance to which said variable condensers are adjusted and the distance to which said variable resistors are adjusted.

6. In a computer for guiding a vehicle along a predetermined course at a predetermined speed in response to information based on the actual position of said vehicle with respect to a first and a second point, the angle made by said course with the base line joining said first and second points, the instant at which said vehicle crosses said base line, and the distance between said point of intersection and said first and second points expressed as shaft positions, mean to represent the product of said time elapsed since crossing said base line and said predetermined speed as a product shaft position, means to generate a first potential from said product shaft position proportional to the square of said product, means to generate a second potential from said shaft position representative of said distance from said intersection to said first point proportional to the square of said distance, means to generate a third potential from said product shaft position and said latter named shaft position proportional to the product of said product and said distance from said intersection to said first point, means to generate a fourth potential proportional to the negative of twice the cosine of the heading angle, means to generate a fifth potential proportional to the product of said third and fourth potentials, means to generate a sixth potential from said shaft position representative of the distance between said point of intersection and said second point proportional to the square of said distance, means to generate a seventh potential from said product shaft position and said latter-named shaft position proportional to the product of said product and the distance between said point of intersection and said second point, means to generate an eighth potential proportional to the negative of twice the cosine of the supplemental angle of the heading angle, means to obtain a ninth potential proportional to the product of said seventh and eighth potentials, means to add said first, second and fifth potentials to obtain a tenth potential proportional to the square of the distance of said vehicle from said first point according to said predetermined speed and heading angle, means to add said first, sixth and ninth potentials to obtain an eleventh potential proportional to the square of the distance of said vehicle from said second point according to said predetermined speed and heading angle, means to generate a twelfth potential proportional to the square of the actual distance of said vehicle from said first point, means to generate a thirteenth potential proportional to the square of the actual distance of said vehicle from said second point, means to combine opposingly said tenth and said twelfth potentials and said eleventh and said thirteenth potentials to obtain error potentials proportional to the deviation of said vehicle from said predetermined heading and from said predetermined speed.

7. In a computer for guiding a vehicle along a predetermined course at a predetermined speed in response to information based on the actual position of said vehicle with respect to a first and a second point, the angle made by said course with the base line joining said first and second points, the instant at which said vehicle crosses said base line, and the distance between said point of intersection and said first and second points expressed as shaft positions, the combination of means for converting the product of the time elapsed since said vehicle crossed said base line and said predetermined speed into a representative shaft position, means for converting said latter named shaft position into a shaft position representative of the square of said product, means for converting said latter named shaft position into a first potential proportional to the square of said product, means for converting said shaft position representative of the distance between said point of intersection and said first point into a shaft position representative of the square of said latter named distance, means for converting said latter named shaft position into a second potential proportional to the square of said distance between said point of intersection and said first point, means for obtaining a shaft position representative of the product of said predetermined speed and the time elapsed since said vehicle crossed said baseline and said distance from said intersection to said first point, means for converting said latter named shaft position into a third potential proportional to the product of the product of said predetermined speed and the time elapsed since said vehicle crossed said base line and said distance between said point of intersection and said first point, means to produce a fourth potential proportional to the negative of twice the cosine of the angle made by the course of said vehicle with said baseline, means to multiply said third and fourth potentials to obtain a fifth potential representative of said product, means to convert said shaft position representative of the distance between said point of intersection and said second point into a shaft position representative of the square of said latter named distance, means to convert said latter named shaft position into a sixth potential representative of the square of said distance between said point of intersection and said second point, means to convert into a shaft position representative of their product the shaft positions representative of the product of the time elapsed since said vehicle crossed said base line and said predetermined speed, and said distance between said point of intersection of said second point, means to convert said latter named shaft position into a seventh potential representative of said latter named product, means to produce an eighth potential proportional to the negative of twice the cosine of the angle included between said heading and that portion of the base line between said point of intersection and said second point, means to multiply said seventh and eighth potentials to obtain a ninth potential representative of their product, means to generate a tenth potential representative of the square of the actual distance between said vehicle and said first point, means to generate an eleventh potential representative of the square of the actual distance between said vehicle and said second point, means to add said first, second, and fifth potential to obtain a twelfth potential representative of the square of the distance between said first point and said vehicle in accordance with said predetermined speed and said heading, means to add said first, sixth and ninth potentials to obtain a thirteenth potential representative of the square of said distance between said second point and said vehicle in accordance with said predetermined speed and said heading, an angle resolver having a stator with two stator windings and a rotor with two rotor windings, means to opposingly impress said tenth potential and said twelfth potential on one of said stator windings, means to opposingly impress said eleventh potential and said thirteenth potential on the other of said stator windings, means to position said rotor at the angle made by said vehicle heading with said base line whereby there is induced in one of said rotor windings a voltage substantially proportional to the difference between the actual and predetermined speed and there is induced in the other of said rotor windings a voltage substantially proportional to the deviation of said vehicle from its predetermined heading.

8. Apparatus for obtaining a potential proportional to the product of two functions, each of said functions being expressed as the position of a function shaft comprising a variable frequency oscillator of the type wherein the frequency determining elements consist of a series-connected variable resistor and variable condenser connected in series with a parallel connected variable resistor and variable condenser, said variable resistors being ganged to be simultaneously adjustable and to have equal values, said variable condensers being ganged to be simultaneously adjustable and to have equal values, said variable resistors and variable condensers being calibrated in terms of a respective one of said two functions and respectively mechanically coupled to said function shafts, a high impedance connected in series with the output from said oscillator and a condenser connected in parallel with said oscillator output through said high impedance, the potential output across said latter named condenser being proportional to the product of the impedances to which said variable resistors and said variable condensers are adjusted by said two function shafts.

JOHN B. GEHMAN.

REFERENCES CITED

The following references are of record in the file of this patent:

UNITED STATES PATENTS

| Number | Name | Date |
|---|---|---|
| 2,439,381 | Darlington | Apr. 13, 1948 |
| 2,442,383 | Stewart | June 1, 1948 |